Figure 1:
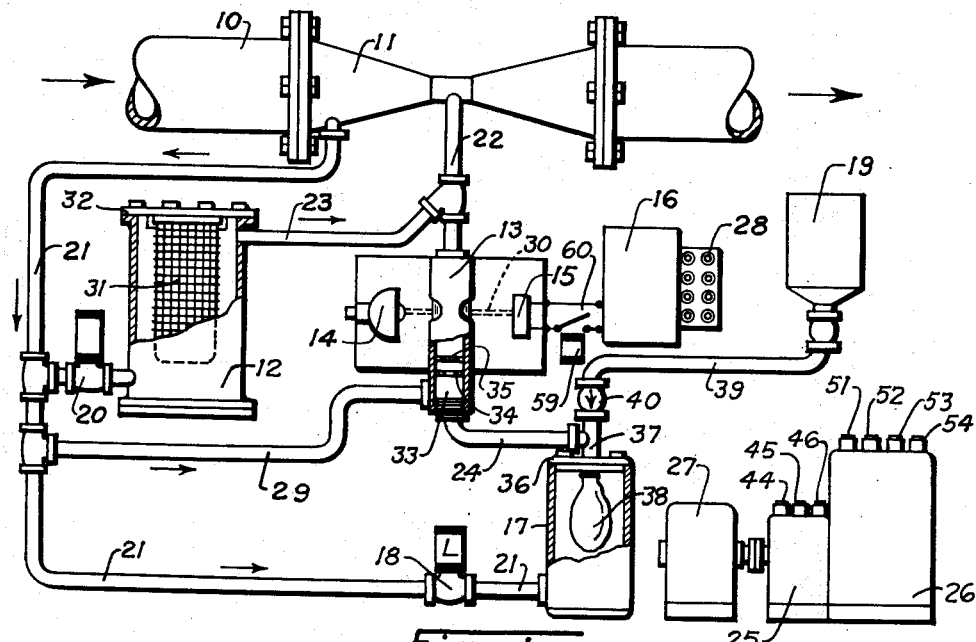

Jan. 15, 1963  A. P. FATTOR  3,073,330
AUTOMATIC REAGENT REGULATOR
Filed Feb. 13, 1961

INVENTOR.
ARTHUR P. FATTOR
BY
ATTORNEY.

United States Patent Office 3,073,330
Patented Jan. 15, 1963

3,073,330
AUTOMATIC REAGENT REGULATOR
Arthur P. Fattor, 2533 S. University, Denver, Colo.
Filed Feb. 13, 1961, Ser. No. 88,852
5 Claims. (Cl. 137—93)

This invention relates to an automatic solution-control device for periodically sampling a solution to determine the amount of a given reagent therein and for automatically increasing or decreasing the amount of reagent should the sample show a deficiency or excess thereof. The invention will find many uses such as maintaining the chemical balance of solutions such as electro-plating solutions and the like. While its use is not limited, it is more particularly designed for the automatic maintainance of the proper chlorine, fluorine or iodine content in water systems. For the purpose of description, the device will be described herein used as a chlorinator for purifying drinking water and the water in swimming pools and the like.

The principal object of this invention is to provide a fully automatic device which will periodically sample the water in a water system to determine the chlorine content thereof and which, if the chlorine content is deficient, will automatically add chlorine and if the chlorine content is excessive will withhold the addition of chlorine to the water so as to constantly maintain the chlorine residual within the established standards for potable waters.

Another object of the invention is to so construct the device that the above functions will be efficiently, continuously, periodically, and automatically maintained without personal attention.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 2:
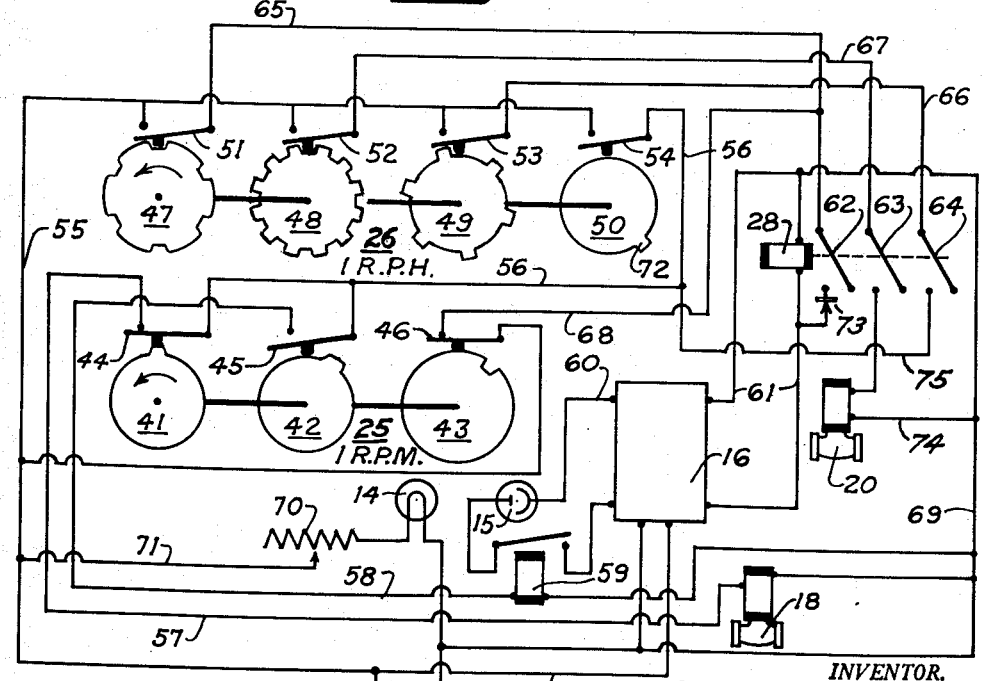

In the drawing:

FIG. 1 is a diagrammatic flow sheet showing the relation of the various elements in the improved chlorinator; and FIG. 2 is a circuit diagram showing the principal interelement electrical circuits thereof.

Briefly, the invention comprises automatically adding a chemical indicator to the water or other solution at predetermined intervals. The indicator is of a nature to react with a given reagent in the water or other solution to produce a color therein, the intensity of color instigated by the indicator being proportional to the amount of given reagent in the solution. Thence projecting a light beam through a sample of the colored solution and into a photoelectric cell which, if the content of the given reagent is too low, will actuate suitable mechanism to add additional reagent to the solution. For water uses, the given reagent is chlorine and the preferred chemical indicator is orthotoluidine which, when added to water containing chlorine, produces a greenish color, the intensity of which increases with increasing amounts of chlorine.

The basic elements of the improved automatic chlorinator are diagrammatically indicated in FIG. 1 and are referred to herein by numeral as follows: water main 10, venturi section in water main 11, chlorine reservoir 12, sample scanning tube 13, photoelectric light source 14, photo-electric cell 15, electronic amplifier 16, cell circuit to amplifier 60, relay in cell circuit 59, orthotoluidine supply tank 17, orthotoluidine injection valve 18, orthotoluidine reservoir 19, chlorine injection valve 20, water sample feed conduit 21, water return conduit 22, chlorine supply conduit 23, orthotoluidine supply conduit 24, secondary sequencer 25, main sequencer 26, sequencer driving motor 27, multiple switch solenoid 28, sample supply conduit 29, 110 v. A.C. ground circuit 55, and 110 v. A.C. live main 69.

Briefly, a small stream of water flows continuously from the water main 10 through the feed conduit 21, the sample supply conduit 29, the sample scanning tube 13, and thence back to the venturi section 11 of the main 10 through the return conduit 22. At intervals, controlled by the sequencers 25 and 26, the orthotoluidine injection valve 18 will be actuated to cause orthotoluidine to flow into the water flowing through the scanning tube 13 to form an indicating solution which will have a degree of opaqueness proportional to the amount of chlorine in the main 10. A light beam 30 from the light source 14 will be projected through the water in the scanning tube and will impinge upon the photoelectric cell 15. The brilliancy of the light striking the photoelectric cell 15 will be in reverse proportion to the opaqueness of the water and, if the chlorine contents be below a selected standard, the light will be sufficient to energize the photoelectric cell 15. The current from the cell 15 will trigger the amplifier 16 to cause a shot of water under pressure to flow into the chlorine reservoir thereby forcing a shot of chlorine therefrom through the chlorine supply conduit 23 into the water returning to the main 10. If the chlorine content of the indicating solution be at or above the selected standard, insufficient light will pass to actuate the above sequence and no chlorine will be added.

In the embodiment illustrated, the secondary sequencer 25 consists of three cam discs 41, 42 and 43 mounted on a common shaft driven from the motor 27 at a speed of one revolution per minute. The cam discs 41, 42 and 43 are provided with lobes acting to close normally open switches 44, 45 and 46, respectively. The main sequencer 26 consists of four cam discs 47, 48, 49 and 50 mounted on a common shaft also driven from the the motor 27 at a speed of one revolution per hour. The cam discs 47, 48, 49 and 50 of the main sequencer act to close normally open switches 51, 52, 53 and 54, respectively.

The multiple switch solenoid 28 acts to simultaneously close a holding switch 62, a chlorine switch 63 and a photoelectric cell and orthotoluidine switch 64.

The switches of the main sequencer 26 act to close contact with the ground 110 v. A.C. main 55. The main sequencer switch 51 is connected through a conductor 65 with the holding switch 62 and thence through a rectifier element 73 to the live A.C. 110 v. main 69 and through the solenoid 28 so that when both switches 51 and 62 are closed D.C. current will be supplied to the solenoid 28 to hold the multiple switches 62, 63, and 64 closed. The main sequencer switch 52 is connected through a conductor 67 with the multiple switch 63 to close a circuit through the solenoid of the chlorine injection valve 20 and thence through a conductor 74 to the 110 v. main 69 so that when both switches 52 and 63 are closed, current will be supplied to open the chlorine valve 20. The main sequencer switch 53 is connected through a conductor 66 to the multiple switch 64 and thence through conductors 75 and 56 to the switches 44 and 45 of the secondary sequencer and when both switches 53 and 64 are closed, current will be supplied to the secondary sequence switches 44 and 45. Referring to the latter two switches, it will be noted that when the switch 44 is closed, current will be supplied through a conductor 57 to energize the orthotoluidine injection valve 18 and when the switch 45 is closed, current will be supplied through a conductor 58 to the relay 59 to close the photoelectric circuit 60. Thus, when switches 53, 64 and 44 are closed, the orthotoluidine valve 18 will be actuated and when switches 53, 64 and 45 are closed, the photoelectric circuit will be energized.

The main sequencer switch 54 is connected directly to the secondary sequencer switches 44 and 45 so that when the switch 54 is closed, the photoelectric circuit 60 and the othotoluidine valve 18 will be actuated as above described independently of the multiple switch 64.

In the main sequencer 26, cam discs 47 and 48 are contoured to hold the switches 51 and 52 closed for approximately 10 minute and 3 minute intervals, respectively. The cam disc 49 is contoured to give a momentary closing of the switch 53 at 10 minute intervals with an approximate 10 minute open period and the cam 50 has a single switch-closing lobe 72 to close the switch 54 momentarily at hourly intervals.

The secondary sequencer switch 46 closes a circuit from the ground 55 through a conductor 68 to the holding switch 62, the rectifier element 73 and the solenoid 28 to the live side of the 110 v. A.C. source.

In the secondary sequencer 25, the cam discs 41 and 42 are contoured to give a momentary closing of the switches 44 and 45 each minute, the switch 44 closing in advance of the switch 45. The cam disc 43 is contoured to open the switch 46 momentarily once each minute to break the holding circuit 68 to the solenoid 28.

The output circuit of the amplifier 16 is connected, as shown at 61, to the multiple switch solenoid 28. The amplifier may have any conventional circuitry for amplifying the current received from the photoelectric circuit sufficiently to provide operative current for the solenoid 28.

The current for operating the light source is obtained from the main 110 v. A.C. leads 55 and 69 through a conductor 71 and an adjustable rheostat 70. Adjustment of the latter regulates the light intensity to cause the chlorinator to operate at a desired chlorine content. The chlorine reservoir 12, the scanning tube 13, the orthotoluidine supply tank 17 and the sequencers may be of any suitable design to accomplish the desired functions.

As illustrated, the chlorine reservoir contains a chlorine basket 31 which is suspended from a top cover 32 thereon. Soluble chlorine-containing granules are placed in the basket 31 and, since the reservoir is maintained constantly filled, the water will become saturated in chlorine. The saturated solution is forced from the reservoir through the chlorine supply conduit when the chlorine injection valve 20 admits additional water under pressure.

One form of the scanning tube 13 is shown in FIG. 1 in which the tube is formed from transparent plastic preferably opaqued except in the path of the light beam 30. The water enters adjacent the bottom of the tube from the supply conduit 29. The orthotoluidine also enters the bottom from the orthotoluidine supply circuit 24. The bottom portion of the tube 13 forms a mixing chamber 33 closed by a top partition plate 34 having a central orifice over which a perforated baffle plate 35 is positioned to impart a further mixing action to the slowly rising water.

One form of the orthotoluidine supply tank 17 is illustrated in FIG. 1. The water enters the bottom from the feed conduit 21. The top is closed by a cap 36 through which a riser tube 37 projects. The orthotoluidine is discharged from the riser tube 37 into the orthotoluidine supply conduit 24. An expansible chamber 38, such as a rubber "balloon," is sealed about the lower extremity of the riser tube within the tank 17 and is filled with orthotoluidine in any desired manner. As illustrated, orthotoluidine flows from the orthotoluidine reservoir 19 through a gravity conduit 39 in which a conventional spring-loaded check valve 40 is placed. It can be seen that if water be admitted under pressure from the feed conduit 21 it will act to contract the chamber 38 to force orthotoluidine therefrom into the supply conduit 24. When the flow of water is shut off, the check valve 40 will open to relieve the pressure and admit additional orthotoluidine.

*Operation*

Let us assume that water is flowing through the system, that all of the cam discs are rotating, that the light source 14 is functioning and that the lobe 72 of the main sequencer has closed the switch 54 and the disc 41 of the secondary sequencer has closed the switch 44 to energize the orthotoluidine valve 18 to inject orthotoluidine into the scanning tube 13.

A short time later, say 5 seconds, the disc 42 will close the switch 45 to energize the photoelectric tube 15. By this time, the indicating solution has become completely intermixed. If the sample is sufficiently opaque, insufficient current will flow to the amplifier 16 to operate the remaining circuits and the chlorinator will not function.

Now let us assume that when the hour switch 54 is again closed, an hour later, the water sample will be sufficiently clear, due to a deficiency of chlorine, to allow the light beam to energize the photoelectric cell sufficiently to trigger the amplifier so as to supply current, through the amplifier output circuit 61, to energize the solenoid 28 so as to close the solenoid holding switch 62, the chlorine switch 63, and the photoelectric and orthotoluidine switch 64.

The chlorine switch 63 will close the circuit 67 between the switch 52 of the main sequencer and the chlorine injection valve 20 so that when the next successive lobe on the cam disc 48 closes the switch 52, the chlorine injection valve 20 will be opened to cause chlorine to flow into the water return 22. The lobes on the cam disc 48 are spaced to close a substantially three-minute contact every 5 minutes.

Since the hour switch 54 will be closed only a short period, say 5 seconds, means must be provided to maintain the multiple contact solenoid switch 28 closed when conductor 56 is opened at the hour switch 54. This is accomplished by the closed holding switch 62 and the switch 46 on the secondary sequencer, as well as switch 51 of the main sequencer. The latter switch will remain closed for periods of substantially 10 minutes so that the solenoid switch 28 will remain closed for like periods to allow the sequence of operations to take place. The multiple switch will be opened at the termination of the ten minute interval by the switch 46 of the secondary sequencer 25 provided the sampling in tube 13 indicates the liquid is sufficiently opaque and will remain open until the next hourly sequence is instigated at the hour switch 54. During the ten minute period, the cam 48 operates the switch 52 twice to inject two three minute shots of chlorine into the main.

Thus, it can be seen that if the water in the main 10 is properly chlorinated at any given hourly interval no chlorination will take place. If, however, the chlorine content be deficient at any hourly interval additional chlorine will be introduced at 10 minute intervals during the following hour or hours until the deficiency has been replaced.

While a specific form of the improvement has been described and illustrated herein, it is to be understood that the same may be varied within the scope of the appended claims, without departing from the spirit of the invention.

Just before the ten minute period has elapsed, cam 49 operates its switch 53 to close the circuit via cam 41 operated switch 44 to inject orthotoluidine into the cell and soon thereafter cam 42 operates to close switch 45 to energize photocell switch solenoid 59. If the liquid in tube 13 be insufficiently opaque, when the cam 43 releases the switch 46 at a time when main sequencer 47 has its switch 51 released, the solenoid 28 will be energized to hold the switches 62, 63 and 64 closed until switch 46 is again closed. Then main sequencer switch 51 holds the solenoid 28 energized for another two shot injection of chlorine into the main.

Recapitulating, once an hourly test is initiated by operation of cam 50, test cycles are begun, the first step being injection of indicator fluid—orthotoluidine—into the tube 13 and the next step, a closing of the phototube circuit. If there be sufficient chlorine in the system, the switches 62 to 64 fail to close and in the ensuing portion of the hour no further injections of indicator fluid into the tube 13 takes place. Nor is any chlorine added to the main. The next test would take place an hour later. If in a test, there is insufficient chlorine in the main, the solenoid 28 is energized, the switches 62, 63 and 64 close, and for periods during the next ten minutes chlorine is injected into the main. Due to the action of cam 49, indicator fluid is renewed in tube 13 just before the end of the ten minute period for another test by photocell 15 at which time either the coincidence of insufficient energization of solenoid 28 by the amplifier and opening of both switches 51 and 46 will allow switches 62, 63 and 64 to drop out or energization of solenoid 28 from the amplifier 16 will hold the switches closed until cam 43 again closes switch 46. Thus as many injections will be made in successive 10 minute periods as may be necessary, until the desired concentration of chlorine in the main is attained.

Having thus described the invention what is claimed and desired to be secured by Letters Patent is:

1. In a repeat cycle timer for a water chlorinator, the combination comprising a tube and a photocell sensing the opaque condition of liquid passing through the tube, a main group of switches, a secondary group of switches and simultaneously driven cams controlling said switches, the cams of said secondary switches operating its switches at a multiple of the rate of the cam operation of the main switches, a fourth switch of the main group of switches being in series with a first and second paralleled switch of the secondary group of switches, a solenoid controlled valve for feeding indicating reagent to said tube, said first paralled switch controlling said valve to momentarily open the same to feed indicating fluid to said tube, a relay in series with the photocell, said second paralleled switch controlling said relay, controlled by the output from said first relay, a first switch of said main group of switches being connected in series with a first armature controlled switch to establish a holding circuit for the second relay, a second solenoid, a second switch of said main group of switches being in series with the second switch of said armature controlled switches and in series with the second solenoid, and a third switch of the main group of switches being in series with a third armature controlled switch, said third armature controlled switch being in series with the paralleled first and second switches of the secondary group of switches.

2. The structure of claim 1 in combination with a third switch of the secondary group of switches, said third switch of the secondary group shunting the first switch of the main group of switches.

3. The structure of claim 1 in which the closing of the second paralleled switch is delayed with respect to the closing of the first paralleled switch.

4. The structure as defined in claim 3 in combination with a line feeding chlorinated water into the tube for admixture with the indicating fluid, the photocell circuit being closed only after the indicating fluid has been mixed with the chlorinated water.

5. The structure as defined in claim 4 in which the second solenoid controls a valve to admit chlorine into the system which feeds chlorinated water into the tube.

References Cited in the file of this patent

UNITED STATES PATENTS

| 1,960,615 | Baker | May 29, 1934 |
| 2,962,610 | Husband | Nov. 29, 1960 |